United States Patent
Steves et al.

(10) Patent No.: US 11,292,953 B2
(45) Date of Patent: Apr. 5, 2022

(54) METHOD OF PRODUCING HYDROXYALKYLCARBAMATE-FUNCTIONAL POLYAMIDES AND USES THEREOF

(71) Applicant: Huntsman Petrochemical LLC, The Woodlands, TX (US)

(72) Inventors: Robert Carl Steves, The Woodlands, TX (US); John H. Clements, The Woodlands, TX (US); David C. Lewis, The Woodlands, TX (US)

(73) Assignee: HUNTSMAN Petrochemical LLC, The Woodlands, TX (US)

( * ) Notice: Subject to any disclaimer, the term of this patent is extended or adjusted under 35 U.S.C. 154(b) by 174 days.

(21) Appl. No.: 16/499,624

(22) PCT Filed: Apr. 24, 2018

(86) PCT No.: PCT/US2018/028995
§ 371 (c)(1),
(2) Date: Sep. 30, 2019

(87) PCT Pub. No.: WO2018/200429
PCT Pub. Date: Nov. 1, 2018

(65) Prior Publication Data
US 2020/0115615 A1  Apr. 16, 2020

Related U.S. Application Data

(60) Provisional application No. 62/489,003, filed on Apr. 24, 2017.

(51) Int. Cl.
*C09K 8/36* (2006.01)
*C08G 73/10* (2006.01)

(52) U.S. Cl.
CPC ............ *C09K 8/36* (2013.01); *C08G 73/1042* (2013.01)

(58) Field of Classification Search
None
See application file for complete search history.

(56) References Cited

U.S. PATENT DOCUMENTS

| | | | |
|---|---|---|---|
| 2,765,324 A * | 10/1956 | Niederhauser | D06M 13/405 554/59 |
| 8,163,675 B2 | 4/2012 | Navarrete et al. | |
| 8,727,005 B1 | 5/2014 | Gamage et al. | |
| 8,765,644 B2 | 7/2014 | Yu et al. | |
| 8,927,468 B2 | 1/2015 | Hurd et al. | |
| 2004/0110642 A1 | 6/2004 | Thompson et al. | |
| 2005/0049147 A1 | 3/2005 | Patel et al. | |
| 2011/0214874 A1 * | 9/2011 | Dakin | C09K 8/34 166/311 |
| 2011/0306523 A1 | 12/2011 | Yu et al. | |
| 2015/0051120 A1 * | 2/2015 | Hurd | C09K 8/36 507/131 |

FOREIGN PATENT DOCUMENTS

WO   2015/026689   2/2015

OTHER PUBLICATIONS

International Search Report and Written Opinion received in corresponding PCT Application No. PCT/US2018/028995, dated Oct. 29, 2018.

* cited by examiner

*Primary Examiner* — John J Figueroa
(74) *Attorney, Agent, or Firm* — Huntsman Petrochemical LLC; Aleece M. Hayes

(57) ABSTRACT

A modified drilling fluid comprising a drilling fluid and the reaction product(s) of a polyalkylene polyamine, fatty acid, and alkylene carbonate, and methods of making and using the same.

17 Claims, No Drawings

US 11,292,953 B2

METHOD OF PRODUCING HYDROXYALKYLCARBAMATE-FUNCTIONAL POLYAMIDES AND USES THEREOF

CROSS-REFERENCE TO RELATED APPLICATIONS

This application is the National Phase of International Application PCT/US2018/0028995 filed Apr. 24, 2018 which designated the U.S. and which claims priority to U.S. App. Ser. No. 62/489,003 filed Apr. 24, 2017. The noted applications are incorporated herein by reference.

This application claims the benefit of U.S. Provisional Patent Application Ser. No. 62/489,003, filed Apr. 24, 2017, the entire disclosure of which is incorporated herein by reference.

STATEMENT REGARDING FEDERALLY SPONSORED RESEARCH OR DEVELOPMENT

Not applicable.

FIELD

The present disclosure generally relates to a modified drilling fluid comprising a drilling fluid and a hydroxyalkylcarbamate-functional polyamide composition. More specifically, the present disclosure relates to a modified drilling fluid comprising a drilling fluid and the reaction product(s) of a polyalkylene polyamine, fatty acid, and alkylene carbonate, and methods of making and using the same.

BACKGROUND

Drilling fluids (also referred to as "drilling muds", "drilling mud formulations", or simply "muds") are used to facilitate the drilling of wells. Drilling fluids are pumped from the surface, through the wellbore, and back to the surface, thereby serving a variety of functions, including: removing drill cuttings from the drilling area and transporting the cuttings to the surface, cooling and lubricating the drill bit, exerting hydrostatic pressure to prevent high-pressure oil, gas, and other fluids from prematurely entering the wellbore, and maintaining the stability of the wellbore walls.

A variety of drilling fluids (or "drilling muds") exist and are classified according to the base component of the drilling muds. For example, there are water based drilling muds and oil based drilling muds. Of particular interest are drilling muds comprising emulsions of water and oil. For example, water-in-oil emulsion drilling muds (also referred to as a "water-in-oil invert emulsion drilling muds") comprise an aqueous phase dispersed as droplets throughout a continuous (i.e., external) oil or synthetic oil phase, which may comprise diesel fuel or other liquid hydrocarbon mixtures (e.g., olefinic and/or paraffinic species in the $C_{16}$-$C_{18}$ range). The aqueous dispersed (i.e., internal) phase is normally a saline, aqueous solution (e.g., a chloride-containing brine solution, such as a 30% calcium chloride base).

Water-in-oil emulsion drilling muds typically result from the blending of a hydrocarbon oil with a water or brine under high shear conditions and in the presence of a suitable emulsifier. Emulsification is complete when there is no distinct layer of water in the fluid. The emulsifier is required not only to form a stable dispersion of water droplets in the oil phase, but also to maintain any solids such as weighting material additives (e.g., barites) or drill cuttings in an oil-wet state.

Various emulsifiers are used in the art including, for example:

U.S. Pat. No. 8,163,675 describes emulsifiers for oil-based drilling muds based on polyamines and fatty acid/maleic anhydride.

U.S. Pat. No. 8,727,005 describes an emulsifier composition comprising an emulsifier, a diluent, and a thinner, wherein the emulsifier comprises a carboxylic acid-terminated polyamide ("CATP") that is reacted with an acid anhydride like maleic anhydride.

U.S. Pat. No. 8,765,644 describes an emulsifier comprising polyamides derived from fatty acid/carboxylic acid, and optionally alkoxylated polyamides.

U.S. Pat. No. 8,927,468 describes an emulsifier comprising (1) a carboxylic acid terminated fatty amine condensate, (2) a modified tall oil, or (3) a blend of these components, where the component or blend is neutralized and spray dried. Example 1 teaches a carboxylic acid terminated fatty amine condensate prepared by reacting tall oil fatty acids (TOFA) with diethylenetriamine (DETA) to yield a fatty acid amine condensate, and then converting the unreacted amine termini to carboxylic acid termini through subsequent reaction with maleic anhydride (MA).

Despite the state of the art, there is a continuous need for the development of drilling fluids capable of withstanding higher temperatures for longer periods of time. Provided herein is a modified drilling fluid addressing the needs in the art and methods of making and using such.

DETAILED DESCRIPTION

Before explaining at least one embodiment of the present disclosure in detail, it is to be understood that the present disclosure is not limited in its application to the details of construction and the arrangement of components or steps or methodologies set forth in the following description. The present disclosure is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference to the extent that they do not contradict the instant disclosure.

All of the compositions and/or methods disclosed herein can be made and executed without undue experimentation in light of the present disclosure. While the compositions and methods of the present disclosure have been described in terms of preferred embodiments, it will be apparent to those having ordinary skill in the art that variations may be applied to the compositions and/or methods and in the steps or sequences of steps of the methods described herein without departing from the concept, spirit, and scope of the present disclosure. All such similar substitutes and modifications apparent to those skilled in the art are deemed to be within the spirit, scope, and concept of the present disclosure.

As utilized in accordance with the present disclosure, the following terms, unless otherwise indicated, shall be understood to have the following meanings.

The use of the word "a" or "an", when used in conjunction with the term "comprising", "including", "having", or "containing" (or variations of such terms) may mean "one", but it is also consistent with the meaning of "one or more", "at least one", and "one or more than one".

The use of the term "or" is used to mean "and/or" unless clearly indicated to refer solely to alternatives and only if the alternatives are mutually exclusive.

Throughout this disclosure, the term "about" is used to indicate that a value includes the inherent variation of error for the quantifying device, mechanism, or method, or the inherent variation that exists among the subject(s) to be measured. For example, but not by way of limitation, when the term "about" is used, the designated value to which it refers may vary by plus or minus ten percent, or nine percent, or eight percent, or seven percent, or six percent, or five percent, or four percent, or three percent, or two percent, or one percent, or one or more fractions therebetween.

The use of "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it refers. In addition, the quantities of 100/1000 are not to be considered as limiting since lower or higher limits may also produce satisfactory results.

In addition, the phrase "at least one of X, Y, and Z" will be understood to include X alone, Y alone, and Z alone, as well as any combination of X, Y, and Z. Likewise, the phrase "at least one of X and Y" will be understood to include X alone, Y alone, as well as any combination of X and Y. Additionally, it is to be understood that the phrase "at least one of" can be used with any number of components and have the similar meanings as set forth above.

The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The phrases "or combinations thereof" and "and combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more items or terms such as BB, AAA, CC, AABB, AACC, ABCCC, CBBAAA, CABBB, and so forth. The skilled artisan will understand that typically there is no limit on the number of items or terms in any combination, unless otherwise apparent from the context. In the same light, the term "and combinations thereof" when used with the phrase "selected from the group consisting of" refers to all permutations and combinations of the listed items preceding the phrase.

The phrases "in one embodiment", "in an embodiment", "according to one embodiment", and the like generally mean the particular feature, structure, or characteristic following the phrase is included in at least one embodiment of the present disclosure, and may be included in more than one embodiment of the present disclosure. Importantly, such phrases are non-limiting and do not necessarily refer to the same embodiment but, of course, can refer to one or more preceding and/or succeeding embodiments. For example, in the appended claims, any of the claimed embodiments can be used in any combination.

As used herein, the terms "% by weight", "wt %", "weight percentage", or "percentage by weight" are used interchangeably.

The phrase "substantially free" shall be used herein to mean present in an amount less than 1 weight percent, or less than 0.1 weight percent, or less than 0.01 weight percent, or alternatively less than 0.001 weight percent, based on the total weight of the referenced composition.

The term "alkyl" is inclusive of both straight chain and branched chain groups and of cyclic groups. In some embodiments, the alkyl group may have up to 40 carbons (in some embodiments up to 30, 20, 15, 12, 10, 8, 7, 6, 5, 4, 3, 2, or 1 carbons) unless otherwise specified. Cyclic groups can be monocyclic and in some embodiments, can have from 3 to 10 carbon atoms.

Unless otherwise specified, the reaction conditions disclosed herein are intended to be at atmospheric pressure, i.e., about 101 kPa.

As used herein, the term "ambient temperature" refers to the temperature of the surrounding work environment (e.g., the temperature of the area, building or room where the curable composition is used), exclusive of any temperature changes that occur as a result of the direct application of heat to the curable composition to facilitate curing. The ambient temperature is typically between about 10° C. and about 30° C., more specifically about 15° C. and about 25° C.

According to one aspect, the present disclosure is directed to a modified drilling fluid comprising (a) a drilling fluid and (b) a hydroxyalkylcarbamate-functional polyamide composition produced by (i) reacting a polyalkylene polyamine and a fatty acid to form an amidoamine intermediate product, and (ii) reacting the amidoamine intermediate product and an alkylene carbonate.

In one embodiment, the drilling fluid is a water-in-oil invert emulsion drilling mud comprising a continuous, external oil phase and an internal aqueous phase.

In another embodiment, the drilling fluid is a water-in-oil invert emulsion drilling mud comprising an internal aqueous phase and a continuous, external oil phase having 20:80 to 90:10 by volume aqueous phase to oil phase. In an alternative embodiment, the water-in-oil invert emulsion drilling mud comprises an internal aqueous phase and a continuous, external oil phase having 30:70 to 85:15, or 35:65 to 85:15, or 40:60 to 85:15, or 45:55 to 85:15, or 50:50 to 85:15, or 55:45 to 85:15, or 60:40 to 80:20 by volume aqueous phase to oil phase.

The oil phase can comprise one or more oils chosen from, for example but without limitation, linear, branched, and/or cyclic hydrocarbons. Non-limiting examples of the one or more oils include diesel oil, jet fuel, mineral oil, biodiesel, vegetable oil, animal oil, paraffin oil, white oil, kerosene, internal olefins, hydrogenated oil, alpha olefins, dialkyl carbonates, and/or mixtures thereof.

The aqueous phase can comprise sea water, freshwater, naturally-occurring and artificially-created brines containing organic and/or inorganic dissolved salts, liquids comprising water-miscible organic compounds, and combinations thereof.

Non-limiting examples of suitable brines include chloride-based, bromide-based, or formate-based brines containing monovalent and/or polyvalent cations and combinations thereof. Examples of suitable chloride-based brines include, but are not limited to, sodium chloride, potassium chloride and calcium chloride. Examples of suitable bromide-based brines include, but are not limited to, sodium bromide, calcium bromide, and zinc bromide. Examples of suitable formate-based brines include, but are not limited to, sodium formate, potassium formate, and cesium formate.

In one embodiment, the aqueous phase is a brine solution comprising water and calcium chloride.

The oil-based drilling mud can further comprise at least one of a surfactant, pH modifier, a barite weight agent, organoclays, fluid loss control agents, rheology modifiers, wetting agents, limes, additional brine, dispersants, stabilizers, and/or combinations thereof.

The polyalkylene polyamine can be a polyethylene polyamine, polypropylene polyamine, and/or polybutylene polyamine.

In one embodiment, the polyalkylene polyamine is a polyethylene polyamine. Non-limiting examples of the polyethylene polyamine include diethylenetriamine ("DETA"), triethylenetetramine ("TETA"), tetraethylenepentamine ("TEPA"), pentaethylenehexamine ("PEHA"), and/or higher-order linear ethyleneamines, including their branched and/or cyclic (piperazine-containing) analogs. The polyethylene polyamine can also be at least partially alkoxylated (e.g., ethoxylated) or otherwise functionalized with the proviso that at least two primary and/or secondary amines are available to react with the functional groups of the fatty acid and alkylene carbonate.

In one particular embodiment, the polyalkylene polyamine is selected from the group consisting of diethylenetriamine ("DETA"), triethylenetetramine ("TETA"), tetraethylenepentamine ("TEPA"), pentaethylenehexamine ("PEHA"), and combinations thereof.

In embodiment, the fatty acid wherein the fatty acid is represented by formula (III):

R1—C(O)OH             (III)

wherein R1 is a saturated or unsaturated, branched or straight chain, substituted or unsubstituted hydrocarbyl group having from 6 to 24 carbon atoms.

In one particular embodiment, the fatty acid is derived from a fatty acid source selected from the group consisting of soybean oil, coconut oil, rapeseed oil, tall oil, tallow, and combinations thereof.

Non-limiting examples of the fatty acid include lauric acid, myristic acid, palmitic acid, stearic acid, arachidic acid, behenic acid, oleic acid, linoleic acid, linolenic acid, and/or a combination thereof.

In one embodiment, the fatty acid is tall oil. As known to a person of ordinary skill in the art, tall oil is a product commonly produced as a by-product during the manufacture of wood pulp.

The step of reacting the polyalkylene polyamine and the fatty acid to form the amidoamine intermediate product generally comprises combining the polyalkylene polyamine and fatty acid at a temperature in a range of from about 20° C. to about 120° C., or from about 60° C. to about 100° C., and then heating the combination at a temperature of from about 120° C. to about 200° C., or from about 140° C. to about 180° C. for a time until no water is removed from the reaction. In one embodiment, the combination of the polyalkylene polyamine and the fatty acid is heated at a temperature of from about 120° C. to about 200° C., or from about 140° C. to about 180° C. at a time in a range of from about 2 hours to about 8 hours, or from about 2 hours to about 4 hours.

In one particular embodiment, the step of reacting the polyalkylene polyamine and the fatty acid comprises combining the polyalkylene polyamine and fatty acid at a temperature from about 60° C. to about 100° C. and then heating the combination at a temperature in a range of from about 140° C. to about 180° C. for a time in a range of from about 2 hours to about 4 hours.

The molar ratio of the polyalkylene polyamine and the fatty acid can be in a range of from about 1:1.1 to about 1:3, or from about 1:1.5 to about 1:2.5, or about 1:1.4 to 1:2, or about 1:2, or about 1:1.5.

In one embodiment, the molar ratio of the polyalkylene polyamine and the fatty acid is 1:2.

To exemplify the reaction between the polyalkylene polyamine and the fatty acid to form the amidoamine intermediate product, Scheme 1a demonstrates the reaction between diethylenetriamine ("DETA") and a fatty acid as defined in formula (III) at a molar ratio of 1:2 DETA to fatty acid:

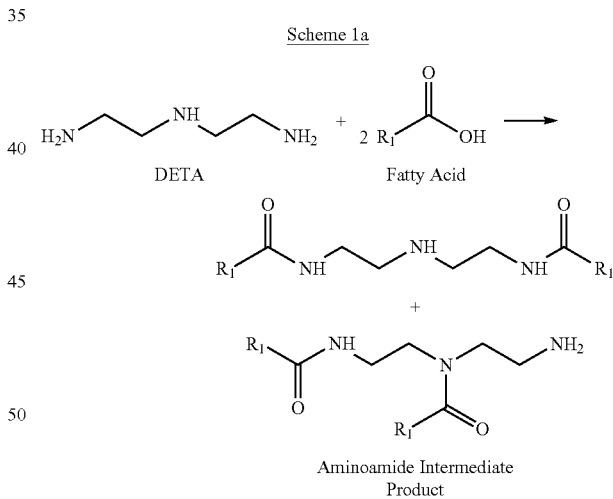

The alkylene carbonate is represented by at least one of formulas (I) and (II) below:

-continued

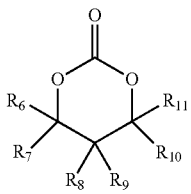

(II)

wherein $R_2$—$R_{11}$ are independently selected from i) hydrogen, ii) an alkyl group, and iii) a moiety comprising a hydroxyl, halide, aldehyde, ether, ester, carboxylic acid, epoxide, or a combination thereof.

In one particular embodiment, the alkylene carbonate is represented by formula (I), wherein $R_2$, $R_3$, and $R_5$ are each hydrogen, and $R_4$ is selected from the group consisting of hydrogen, $CH_3$, $C_2H_5$, and $CH_3OH$.

The step of reacting the amidoamine intermediate product and alkylene carbonate generally comprises heating the amidoamine intermediate product and alkylene carbonate at a temperature in a range of from about 20° C. to about 120° C., or from about 60° C. to about 100° C., or from about 60° C. to about 90° C. for a time in a range of from about 1 hour to about 8 hours, or from about 1 hour to about 4 hours, or from about 1.5 hours to about 2.5 hours, or about 2 hours.

In one embodiment, the step of reacting the amidoamine intermediate product and alkylene carbonate comprises heating the amidoamine intermediate product and alkylene carbonate at a temperature of 60° C. to 90° C. for about 2 hours.

The molar ratio of the alkylene carbonate and the amidoamine intermediate product can be in a range of from about 3:1 to about 0.8:1, or from about 2:1 to about 0.9:1, or about 1:1 of the alkylene carbonate to the amidoamine intermediate product. In one embodiment, the molar ratio of alkylene carbonate is in excess of the amidoamine intermediate product resulting in unreacted alkylene carbonate.

In one embodiment, the step of reacting the amidoamine intermediate product and the alkylene carbonate can be in the presence of a solvent at an amount of less than 80 wt %, or less than 70 wt %, or less than 60 wt %, or less than 50 wt %, or less than 40 wt %, or less than 30 wt %, or less than 20 wt %, or less than 10 wt %, or less than 5 wt %, or less than 4 wt % or less than 3 wt %, or less than 2 wt %, or less than 1 wt % of the total weight of reactants. In another embodiment, the step of reacting the amidoamine intermediate product and the alkylene carbonate can be free of solvent.

Non-limiting examples of the solvent include C1-C8 alcohols and/or linear or branched alkoxylates of said alcohols. Additional examples of compatible solvents may include those containing alcohol, aromatic, amide or ether functional groups. Other alkylene carbonates or excess alkylene carbonate may also serve as solvent. Aromatic or paraffinic solvents such as heavy aromatic naphtha, xylene and toluene may also be used in combination with the above solvents. C16-18 internal olefins can also act as both solvents and as co-emulsifiers. Additional examples of solvents include solvents that will not react with the alkylene carbonate or primary or secondary amines, such solvents exclude esters, organic or inorganic acids, or primary, secondary, and tertiary amines.

To exemplify the reaction between the amidoamine intermediate product and the alkylene carbonate to form the hydroxyalkylcarbamate-functional polyamide composition, Scheme 1b demonstrates the reaction between a 1:1 mole ratio of the amidoamine intermediate product formed from diethylenetriamine ("DETA") and a fatty acid as set forth in Scheme 1a with an alkylene carbonate represented by formula (I) wherein $R_2$—$R_5$ are independently selected from i) hydrogen, ii) an alkyl group, and iii) a moiety comprising a hydroxyl, halide, aldehyde, ether, ester, carboxylic acid, epoxide, or a combination thereof. The hydroxyalkylcarbamate-functional polyamide composition comprises at least one of the compounds represented by formulae (IV), (V), (VI), and (VII) below.

Scheme 1b

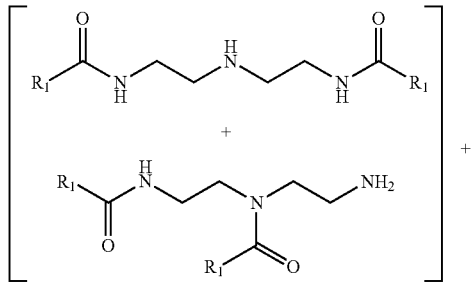

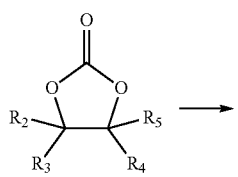

-continued

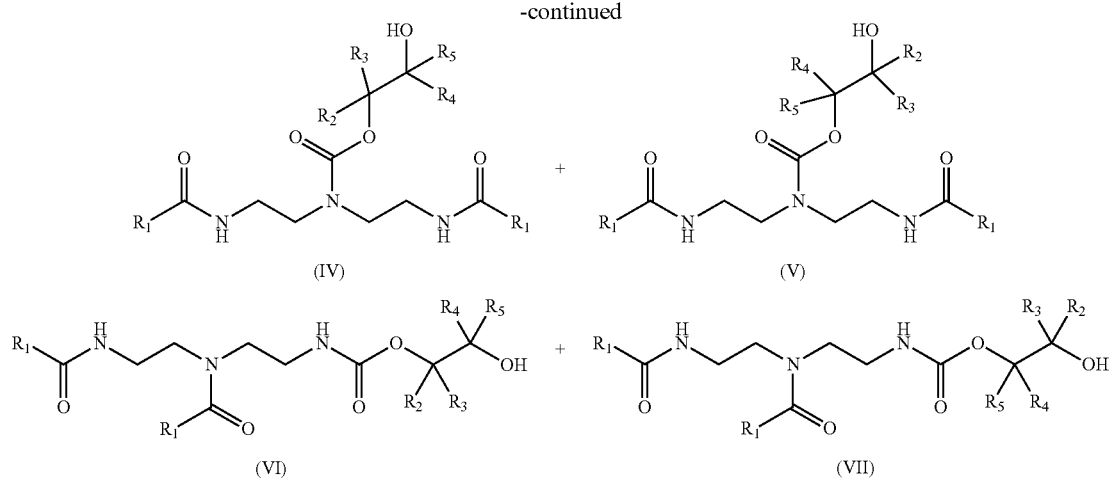

(IV) (V) (VI) (VII)

In another aspect, the present disclosure is directed to a method of producing a modified drilling fluid comprising mixing a drilling fluid (as described above and incorporated herein) and a hydroxyalkylcarbamate-functional polyamide composition (as described above and incorporated herein).

In yet another aspect, the present disclosure is directed to a method of producing a modified drilling fluid, wherein the method comprises first producing a hydroxyalkylcarbamate-functional polyamide (as described above and incorporated herein) and then mixing the hydroxyalkylcarbamate-functional polyamide with a drilling fluid (as described above and incorporated herein).

EXAMPLES

Examples are provided below. However, the present disclosure is to be understood to not be limited in its application to the specific experiments, results, and laboratory procedures disclosed herein below. Rather, the Examples are simply provided as one of various embodiments and are meant to be exemplary and not exhaustive.

The following examples were evaluated in a water-in-oil invert emulsion drilling mud comprising: ISOPAR™ M fluid (ExxonMobil) as the oil phase; 30 wt % calcium chloride brine as the aqueous phase; calcium hydroxide as a pH modifier; NewWate™ barite (Excalibar Minerals LLC); and SURFONIC® OFC 100 co-emulsifier and corrosion inhibitor (Huntsman Corp. or affiliates). The ingredients were mixed in a Hamilton Beach® blender for 30 minutes, during which the temperature of the mixture was increased to 45° C.

The following comparative and experimental examples were added to the oil-based drilling mud as described below:

Comparative Example 1 ("C1")

A 2-liter 4-neck round-bottom reaction flask equipped with a mechanical stirrer, distillate-returning Dean-Stark trap, condenser with nitrogen outlet, pressure equalizing addition funnel with nitrogen inlet and temperature probe was charged with 900.0 g SYLFAT™ 2 TOFA (Arizona Chemicals). Then, an ethyleneamine mixture of 158.0 g DETA, 2.2 g TEPA, and 2.2 g TETA was charged to the addition funnel and the system purged with nitrogen via sparging of the SYLFAT™ 2 Tall Oil Fatty Acid (TOFA) for 30 minutes during which time it was heated to 95° C. The ethyleneamine mixture was added to the TOFA over a period of about 5 minutes during which time the resulting exothermic reaction increased the temperature of the mixture to about 125° C. The mixture was then heated to 165° C. and allowed to reflux for 1 hour during which time the water of reaction was removed overhead. 54.8 g of water was removed over the course of 2 hours. The resulting pre-product mixture (i.e., an amidoamine intermediate product) was then cooled to 75° C. and 520 g NEOFLO® 1-68i C16-18 internal olefin (Shell Chemicals) solvent was added and allowed to mix at 65° C. for 10 minutes prior to discharge and cooling. A dark red-amber liquid was obtained at ambient temperature. Analysis prior to addition of NEOFLO® solvent: total amine no. (mg KOH/g)=94.1, acid no. (mg KOH/g): 8.1.

1000 g of the above pre-product mixture in solvent was heated to 75° C. and 101.3 g of maleic anhydride (briquettes, ground with mortar and pestle) was added slowly over 25 minutes during which time the heat of reaction increased the temperature of the mixture to 80° C. The mixture was then heated to 95° C. and the reaction allowed to proceed for 2 hours. The resulting product mixture was then cooled to 85° C. and 100.9 g SURFONIC® L4-2 solvent (Huntsman Corp. or affiliates) was added and allowed to mix at 80° C. for 10 minutes prior to discharge and cooling. A dark red-amber liquid was obtained at ambient temperature. Analysis prior to addition of L4-2 solvent: total amine no. (mg KOH/g) =15.6, acid no. (mg KOH/g): 48.2.

Experimental Example 1 ("E1")

A 2-liter 4-neck round-bottom reaction flask equipped with a mechanical stirrer, distillate-returning Dean-Stark trap, condenser with nitrogen outlet, pressure equalizing addition funnel with nitrogen inlet and temperature probe was charged with 600.2 g Tall oil fatty acid from Alrez Inc. (Crossett, Ark.). Then, an ethyleneamine mixture of 105.0 g DETA, 1.5 g TEPA and 1.5 g TETA was charged to the addition funnel and the system purged with nitrogen via sparging of the TOFA for 30 minutes during which time it was heated to 80° C. The ethyleneamine mixture was added to the TOFA over a period of about 10 minutes during which time the resulting exothermic reaction increased the temperature of the mixture to about 122° C. The mixture was then heated to 160° C. and allowed to reflux for 1 hour prior to removal of the water of reaction overhead. 33.0 g of water was removed over the course of 2 hours. The resulting pre-product mixture (i.e., an amidoamine intermediate product) was then cooled to 85° C. and 89.6 g JEFFSOL® Ethylene Carbonate (Huntsman Corp. or affiliates) was added and allowed to react at 85° C. for 1 hour prior to discharge and cooling of the hydroxyalkylcarbamate-functionalized polyamides. A brown-yellow soft solid was obtained at ambient temperature. Analysis: total amine no. (mg KOH/g)=53.5, acid no. (mg KOH/g): 4.4.

Experimental Example 2 ("E2")

The same method as described for Experimental Example 1 was used except that 127.5 g of JEFFSOL® glycerine carbonate (Huntsman Corp. or affiliates) was substituted for the ethylene carbonate in the preparation of the hydroxyalkylcarbamate-functionalized polyamides. A brown-yellow soft solid was obtained at ambient temperature. Analysis: total amine no. (mg KOH/g)=48.5, acid no. (mg KOH/g): 6.2.

$$PV = V600 - V300 \qquad (\text{Eqn. 1})$$

$$YP = V300 - PV \qquad (\text{Eqn. 2})$$

where V300 and V600 are the viscosities obtained at rotary speeds of 300 and 600 rpm, respectively.

Measuring Electrical Stability

The electrical stability of the examples (fresh and aged at 75° C. for 16 hours) in peak volts was also measured using an electrical stability meter from OFI Testing Equipment, Inc. Each measurement represents an average following the rejection of the highest and lowest of seven separate readings.

The viscosity and electrical stability measurements for the examples are set forth below in Table 1:

TABLE 1

| EXAMPLES: | C1 | E1 | E2 | E3 |
|---|---|---|---|---|
| Drilling mud components (wt %) | | | | |
| ISOPAR ® M fluid | 20 | 20.3 | 20.5 | 20.7 |
| 30 wt % CaCl$_2$ Brine | 66.3 | 66.0 | 65.8 | 65.8 |
| Calcium Hydroxide | 0.5 | 0.5 | 0.5 | 0.5 |
| Barite | 11.4 | 11.4 | 11.4 | 11.2 |
| SURFONIC ® OFC 100 co-emulsifier and corrosion inhibitor | 1.0 | 0.9 | 0.9 | 0.9 |
| Emulsifier | 1.0 | 0.9 | 0.9 | 0.9 |
| Results, fresh (aged) | | | | |
| Viscosity (cP), 3 rpm | 600 (900) | 500 (600) | 400 (500) | 500 (600) |
| Viscosity (cP), 6 rpm | 450 (600) | 350 (450) | 250 (350) | 300 (400) |
| Viscosity (cP), 100 rpm | 174 (168) | 126 (108) | 111 (96) | 117 (111) |
| Viscosity (cP), 200 rpm | 150 (130) | 108 (86) | 96 (78) | 102 (87) |
| Viscosity (cP), 300 rpm | 137 (112) | 99 (75) | 89 (68) | 94 (75) |
| Viscosity (cP), 600 rpm | 116 (87) | 85 (60) | 76 (57) | 80 (61) |
| PV | 94 (62) | 71 (45) | 63 (46) | 66 (47) |
| YP | 43 (50) | 28 (30) | 26 (22) | 28 (28) |
| Electrical Stability (V) | 113 (455) | 350 (344) | 503 (414) | 339 (370) |

Experimental Example 3 ("E3")

The same method as described for Experimental Example 1 was used except that 110.1 g of JEFF SOL® propylene carbonate (Huntsman Corp. or affiliates) was substituted for ethylene carbonate in the preparation of the hydroxyalkylcarbamate-functionalized polyamides. A brown-yellow soft solid was obtained at ambient temperature. Analysis: total amine no. (mg KOH/g)=50.5 acid no. (mg KOH/g): 5.0.

The viscosities and electrical stability of the compositions were measured as set forth below:

Measuring Viscosity

The viscosities for the examples were measured using a FANN® viscometer (Fann Instrument Company) at rotary speeds of 3, 6, 100, 200, 300, and 600 rpm shortly after preparation and again after aging 16 hours at 75° C. Dial results were converted to centipoise using spring and rotor-bob factors that were both equal to 1. In addition to these viscosities, plastic viscosity, PV, and yield point, YP, values were also recorded by applying the following relations:

As demonstrated in Table 1, the experimental examples comprising the presently disclosed hydroxyalkylcarbamate-functionalized polyamides show improved viscosities and electrical stabilities when fresh and aged as compared with the comparative composition formed by reacting maleic anhydride with an amidoamine intermediate product.

From the above description, it is clear that the present disclosure is well adapted to carry out the object and to attain the advantages mentioned herein as well as those inherent in the present disclosure. While exemplary embodiments of the present disclosure have been described for the purposes of the disclosure, it will be understood that numerous changes may be made which will readily suggest themselves to those skilled in the art which can be accomplished without departing from the scope of the present disclosure and the appended claims.

What is claimed is:

1. A modified drilling fluid, comprising:
   a drilling fluid; and
   a hydroxyalkylcarbamate-functional polyamide composition produced by:

reacting a polyalkylene polyamine and a fatty acid to form an amidoamine intermediate product, wherein the molar ratio of the polyalkylene polyamine to fatty acid ranges from 1:1.5 to 1:2.5; and reacting the amidoamine intermediate product and an alkylene carbonate represented by formula (I) below:

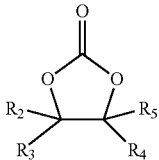

wherein $R_2$—$R_5$ are independently selected from i) hydrogen, ii) an alkyl group, and iii) a moiety comprising a hydroxyl, halide, aldehyde, ether, ester, carboxylic acid, epoxide, or a combination thereof.

2. The method of claim 1, wherein the polyalkylene polyamine is a polyethylene polyamine selected from the group consisting of diethylenetriamine, triethylenetetramine, tetraethylenepentamine, pentaethylenehexamine, and combinations thereof.

3. The modified drilling fluid of claim 1, wherein the fatty acid is represented by formula (III):

$R_1$—C(O)OH (III) wherein $R_1$ is a saturated or unsaturated, branched or straight chain, substituted or unsubstituted hydrocarbyl group having from 6 to 24 carbon atoms.

4. The modified drilling fluid of claim 1, wherein the fatty acid is derived from a fatty acid source selected from the group consisting of soybean oil, coconut oil, rapeseed oil, tall oil, and combinations thereof.

5. The modified drilling fluid of claim 1, wherein the fatty acid is lauric acid, mystic acid, palmilitic acid, stearic acid, arachidic acid, behenic acid, oleic acid, linoleic acid, linolenic acid, or a combination thereof.

6. The modified drilling fluid of claim 1, wherein the alkylene carbonate is represented by formula (I), wherein $R_2$, $R_3$, and $R_5$ are each hydrogen, and $R_4$ is selected from the group consisting of hydrogen, $CH_3$, $C_2H_5$, and $CH_3OH$.

7. The modified drilling fluid of claim 1, wherein the drilling fluid is a water-in-oil invert emulsion drilling mud.

8. A method of producing a modified drilling fluid, comprising:

producing a hydroxylalkylcarbamate-functional polyamide comprising:

reacting a polyalkylene polyamine and a fatty acid to form an amidoamine intermediate product, wherein the molar ratio of the polyalkylene polyamine to fatty acid ranges from 1:1.5 to 1:2.5; and reacting the amidoamine intermediate product and an alkylene carbonate, wherein the alkylene carbonate is represented by formula (I) below:

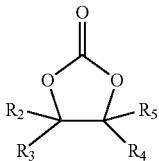

wherein $R_2$—$R_5$ are independently selected from i) hydrogen, ii) an alkyl group, and iii) a moiety comprising a hydroxyl, halide, aldehyde, ether, ester, carboxylic acid, epoxide, or combinations thereof; and mixing the hydroxyalkylcarbamate-functional polyamide with a drilling fluid.

9. The method of claim 8, wherein the polyalkylene polyamine is a polyethylene polyamine selected from the group consisting of diethylenetriamine (DETA), triethylenetetramine (TETA), tetraethylenepentamine (TEPA), pentaethylenehexamine (PEHA), and combinations thereof.

10. The method of claim 8, wherein the fatty acid is represented by formula (III):

$R_1$—C(O)OH         (III)

wherein $R_1$ is a saturated or unsaturated, branched or straight chain, substituted or unsubstituted hydrocarbyl group having from 6 to 24 carbon atoms.

11. The method of claim 10, wherein the fatty acid is derived from a fatty acid source selected from the group consisting of soybean oil, coconut oil, rapeseed oil, tall oil, and combinations thereof.

12. The method of claim 10, wherein the fatty acid is lauric acid, myristic acid, palmilitic acid, stearic acid, arachidic acid, behenic acid, oleic acid, linoleic acid, linolenic acid, or a combination thereof.

13. The method of claim 8, wherein the alkylene carbonate is represented by formula (I), wherein $R_2$, $R_3$, and $R_5$ are each hydrogen, and $R_4$ is selected from the group consisting of hydrogen, $CH_3$, $C_2H_5$, and $CH_3OH$.

14. A method of producing a modified drilling fluid, comprising mixing:

a drilling fluid; and a hydroxyalkylcarbamate-functional polyamide composition produced by:

reacting a polyalkylene polyamine and fatty acid to form an amidoamine intermediate product, wherein the molar ratio of the polyalkylene polyamine to fatty acid ranges from 1:1.5 to 1:2.5; and reacting the amidoamine intermediate product and an alkylene carbonate represented by formula (I) below:

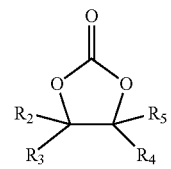

wherein $R_2$— $R_5$ are independently selected from i) hydrogen, ii) an alkyl group, and iii) a moiety comprising a hydroxyl, halide, aldehyde, ether, ester, carboxylic acid, epoxide, or a combination thereof.

15. A modified drilling fluid, comprising:

a drilling fluid; and a hydroxyalkylcarbamate-functional polyamide composition comprising at least one compound represented by formula (VII):

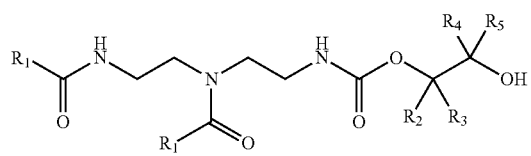

wherein $R_2$—$R_5$ are independently selected from i) hydrogen, ii) an alkyl group, and iii) a moiety comprising a hydroxyl, halide, aldehyde, ether, ester, carboxylic acid, epoxide, or a combination thereof; and wherein $R_1$ is a saturated or unsaturated, branched or straight chain, substituted or unsubstituted hydrocarbyl group having from 6 to 24 carbon atoms.

16. The method of claim 15, wherein the alkylene carbonate is represented by formula (I), wherein $R_2$, $R_3$, and $R_5$ are each hydrogen, and $R_4$ is selected from the group consisting of hydrogen, $CH_3$, $C_2H_5$, and $CH_3OH$.

17. The modified drilling fluid of claim 15, wherein the drilling fluid is a water-in-oil invert emulsion drilling mud.

* * * * *